(12) United States Patent
Uchida et al.

(10) Patent No.: US 8,044,163 B2
(45) Date of Patent: Oct. 25, 2011

(54) AQUEOUS POLYURETHANE RESIN

(75) Inventors: Takashi Uchida, Chiba (JP); Mitsuhiro Nishimura, Shunan (JP)

(73) Assignee: Mitsui Chemicals, Inc., Tokyo (JP)

( * ) Notice: Subject to any disclaimer, the term of this patent is extended or adjusted under 35 U.S.C. 154(b) by 282 days.

(21) Appl. No.: 12/308,718

(22) PCT Filed: Jun. 21, 2007

(86) PCT No.: PCT/JP2007/062524
§ 371 (c)(1),
(2), (4) Date: Dec. 22, 2008

(87) PCT Pub. No.: WO2008/001677
PCT Pub. Date: Jan. 3, 2008

(65) Prior Publication Data
US 2009/0312515 A1    Dec. 17, 2009

(30) Foreign Application Priority Data
Jun. 30, 2006   (JP) .................................. 2006-180690

(51) Int. Cl.
*C08G 18/00* (2006.01)
*C08G 18/04* (2006.01)

(52) U.S. Cl. ............................................ 528/44; 528/75
(58) Field of Classification Search ........................ None
See application file for complete search history.

(56) References Cited

U.S. PATENT DOCUMENTS

| 5,310,577 | A  | * | 5/1994  | Mase et al. ..................... 427/164 |
| 6,069,218 | A  | * | 5/2000  | Vogt-Birnbrich et al. ..... 526/301 |
| 6,440,568 | B1 | * | 8/2002  | Kayanoki et al. .......... 428/425.9 |
| 6,677,400 | B2 | * | 1/2004  | Munzmay et al. ........... 524/839 |
| 2002/0160199 | A1 |  | 10/2002 | Hofacker et al. |
| 2006/0269741 | A1 |  | 11/2006 | Izumi et al. |

FOREIGN PATENT DOCUMENTS

| JP | 4-31423 | 2/1992 |
| JP | 2003-48946 | 2/2003 |
| JP | 2004-531364 | 10/2004 |
| JP | 2006-131741 | 5/2006 |
| WO | WO 2004/078476 A1 | 9/2004 |

* cited by examiner

*Primary Examiner* — Robert Loewe
(74) *Attorney, Agent, or Firm* — Foley & Lardner LLP

(57) ABSTRACT

An aqueous polyurethane resin is obtained by allowing at least a polyol compound, an active hydrogen group-containing compound having anionic group, an active hydrogen group-containing acrylate compound and an alkoxysilyl group-containing polyamine compound to react with a polyisocyanate compound.

8 Claims, No Drawings

AQUEOUS POLYURETHANE RESIN

TECHNICAL FIELD

The present invention relates to an aqueous polyurethane resin, specifically to a primer for plastics, and more specifically to an aqueous polyurethane resin suitably used for a primer for optical plastic lenses.

BACKGROUND ART

Polyurethane resins have conventionally been used as primers in various industrial fields.

For example, in the field of optical plastic lenses, when a hard-coat layer is formed on a surface of a lens substrate, polyurethane resin is used as a primer for improving adhesion between the surface of the lens substrate and the hard-coat layer.

In recent years, in the field of optical plastic lenses, a method for manufacturing a photochromic lens which colors outdoors to function as sunglasses and discolors indoors to function as a transparent glasses, by forming a photochromic coat layer on a surface of a lens substrate has been known, and it is studied that polyurethane resin is used as a primer in order to improve adhesion between the surface of the lens substrate and the photochromic coat layer.

It has been proposed, for example, to use a moisture-curing polyurethane resin as a primer between the surface of the lens substrate and the photochromic coat layer (see, for example, the following Patent Document 1).
Patent Document 1: International Publication No. WO 2004/078476 A1

DISCLOSURE OF THE INVENTION

Problems to be Solved by the Invention

Although the moisture-curing polyurethane resin has good adhesion to substrates such as a lens substrate, it exhibits poor wettability with coat layers, such as a hard-coat layer and a photochromic coat layer, laminated thereon, so that the coat layer repels the moisture-curing polyurethane resin, thereby causing poor adhesion.

It is an object of the present invention to provide an aqueous polyurethane resin capable of providing good adhesion between a plastic substrate and a coat layer laminated on the plastic substrate.

Means for Solving the Problem

To achieve the above object, the aqueous polyurethane resin of the present invention is obtained by allowing at least a polyol compound, an active hydrogen group-containing compound having anionic group, an active hydrogen group-containing acrylate compound and an alkoxysilyl group-containing polyamine compound to react with a polyisocyanate compound.

Moreover, it is preferable that the aqueous polyurethane resin of the present invention is obtained by allowing at least the polyol compound, the active hydrogen group-containing compound having the anionic group and the active hydrogen group-containing acrylate compound to react with the polyisocyanate compound to thereby synthesize an urethane prepolymer having an isocyanate group and a (meth)acryloyl group, and allowing the urethane prepolymer to react with at least the alkoxysilyl group-containing polyamine compound.

Moreover, in the aqueous polyurethane resin of the present invention, it is preferable that the alkoxysilyl group-containing polyamine compound is a compound represented by the following general formula (1).

General Formula (1):

[Chem. 3]

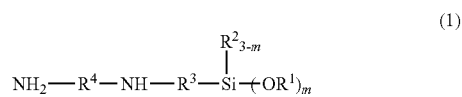

(wherein R1 and R2 are the same or different from each other, and each represents an alkyl group of 1 to 4 carbon atoms; R3 and R4 are the same or different from each other, and each represents an alkylene group of 1 to 4 carbon atoms; and m represents an integer of 1 to 3.)

Moreover, in the aqueous polyurethane resin of the present invention, it is preferable that the polyisocyanate compound is at least one diisocyanate compound selected from the group consisting of hexamethylene diisocyanate, 3-isocyanatomethyl-3,5,5-trimethylcyclohexyl isocyanate, 4,4'-, 2,4'- or 2,2'-dicyclohexylmethane diisocyanate or mixtures thereof, 1,3- or 1,4-bis(isocyanatomethyl)cyclohexane or mixtures thereof, and bis(isocyanatomethyl)norbornane.

Moreover, in the aqueous polyurethane resin of the present invention, it is preferable that the polyisocyanate compound comprises a compound represented by the following general formula (2), and in such case, it is preferable that the isocyanate group is regenerated at 80 to 160° C.

General Formula (2):

[Chem. 4]

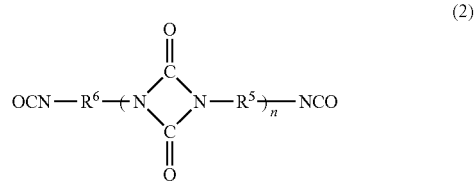

(wherein R5 and R6 are the same or different from each other, and each represents a divalent hydrocarbon group of 6 to 13 carbon atoms; and n represents an integer of 1 to 10.)

Moreover, it is preferable that the aqueous polyurethane resin of the present invention is used as a primer for plastics, and in particular, it is preferable that the aqueous polyurethane resin of the present invention is used as a primer for optical plastic lenses.

Effect of the Invention

The aqueous polyurethane resin of the present invention can provide good adhesion between a plastic substrate and a coat layer laminated on the plastic substrate. Therefore, the aqueous polyurethane resin of the present invention can be suitably used as a primer for plastics.

In particular, the aqueous polyurethane resin of the present invention can provide good adhesion between a plastic lens substrate and a coat layer, such as a hard-coat layer and a photochromic coat layer, laminated thereon. Therefore, the aqueous polyurethane resin of the present invention can be suitably used as a primer for optical plastic lenses.

EMBODIMENT OF THE INVENTION

The aqueous polyurethane resin of the present invention contains at least a polyol compound, an active hydrogen group-containing compound having anionic group, an active hydrogen group-containing acrylate compound and an alkoxysilyl group-containing polyamine compound as an active hydrogen group-containing component, and contains a polyisocyanate compound as a polyisocyanate component, and can be obtained by allowing these active hydrogen group-containing component to react with a polyisocyanate component.

In the present invention, the polyol compound is a compound having two or more hydroxyl groups, and examples thereof include low-molecular-weight polyols and high-molecular-weight polyols (hereinafter referred to as macropolyol).

The low-molecular-weight polyol is a polyol compound having a number average molecular weight of, for example, 60 to 400, and examples thereof include low-molecular-weight diol such as ethylene glycol, propanediol, 1,4-butylene glycol, 1,3-butylene glycol, 1,2-butylene glycol, 1,6-hexandiol, neopentyl glycol, alkane (of 7 to 22 carbon atoms) diol, diethylene glycol, triethylene glycol, dipropylene glycol, cyclohexane dimethanol, alkane-1,2-diol (of 17 to 20 carbon atoms), hydrogenated bisphenol-A, 1,4-dihydroxy-2-butene, 2,6-dimethyl-1-octene-3,8-diol, bishydroxyethoxy benzene, xylene glycol and bishydroxyethylene terephthalate; low-molecular-weight triol such as glycerin, 2-methyl-2-hydroxymethyl-1,3-propanediol, 2,4-dihydroxy-3-hydroxymethylpentane, 1,2,6-hexanetriol, trimethylolpropane, 2,2-bis(hydroxymethyl)-3-butanol and other aliphatic triols (of 8 to 24 carbon atoms); and low-molecular-weight polyol having four or more hydroxyl groups such as tetramethylolmethane, D-sorbitol, xylitol, D-mannitol and D-mannite.

These low-molecular-weight polyols may be used alone or in combination of two or more kinds. Preferably, low-molecular-weight diol and/or low-molecular-weight triol is/are used, or more preferably, low-molecular-weight diol and low-molecular-weight triol are used in combination.

Examples of the macropolyols include polyether polyol, polycarbonate polyol, polyester polyol, acrylic polyol, epoxy polyol, natural oil polyol, silicone polyol, fluorine polyol and polyolefin polyol.

Examples of the polyether polyols include polyalkylene oxides such as polyethylene glycol, polypropylene glycol and polyethylene polypropylene glycol (random or block copolymer) which are obtained by addition reaction of alkylene oxide such as ethyleneoxide and/or propylene oxide, for example, using the above-mentioned low-molecular-weight polyol as an initiator. Examples thereof also include polytetramethylene ether glycol obtained by ring-opening polymerization of tetrahydrofuran.

Examples of the polycarbonate polyols include polycarbonatediols obtained by ring-opening polymerization of carbonates such as ethylene carbonate and dimethyl carbonate, using the above-mentioned low-molecular-weight polyol as an initiator.

Examples of the polyester polyols include those obtained by reaction of one kind or two or more kinds of the above-mentioned low-molecular-weight polyols with carboxylic acid such as oxalic acid, malonic acid, succinic acid, methyl succinic acid, glutaric acid, adipic acid, 1,1-dimethyl-1,3-dicarboxypropane, 3-methyl-3-ethyl glutaric acid, azelaic acid, sebacic acid, other aliphatic dicarboxylic acids (of 11 to 13 carbon atoms), hydrogenated dimer acid, maleic acid, fumaric acid, itaconic acid, orthophthalic acid, isophthalic acid, terephthalic acid, toluene dicarboxylic acid, dimer acid and HET acid, and acid anhydride derived from these carboxylic acids, such as oxalic anhydride, succinic anhydride, maleic anhydride, phthalic anhydride, 2-alkyl succinic anhydride (of 12 to 18 carbon atoms), tetrahydrophtalic anhydride and trimellitic anhydride, and also acid halide derived from these carboxylic acids such as oxalic dichloride, adipic dichloride and sebacic dichloride. Further, examples thereof include lactone polyester polyols such as polycaprolactone polyol and polyvalerolactone polyol, which are obtained by ring-opening polymerization of lactones such as ε-caprolactone and γ-valerolactone, for example using the above-mentioned low-molecular-weight polyol as an initiator.

Examples of the acrylic polyols include copolymers obtained by copolymerizing a polymerizable monomer having one or more hydroxyl groups in its molecule with another monomer copolymerizable with the polymerizable monomer. Examples of the polymerizable monomer having a hydroxyl group include 2-hydroxyethyl(meth)acrylate, hydroxypropyl (meth)acrylate, hydroxybutyl(meth)acrylate, 2,2-dihydroxymethylbutyl(meth)acrylate, polyhydroxyalkyl maleate and polyhydroxyalkyl fumarate. Moreover, examples of such another monomer copolymerizable with these polymerizable monomers include (meth)acrylic acid, alkyl(meth)acrylate (of 1 to 12 carbon atoms), maleic acid, alkyl maleate, fumaric acid, alkyl fumarate, itaconic acid, alkyl itaconate, styrene, α-methyl styrene, vinyl acetate, (meth)acrylonitrile, 3-(2-isocyanate-2-propyl)-α-methylstyrene, trimethylolpropane tri (meth)acrylate and pentaerythritol tetra(meth)acrylate. The acrylic polyol can be obtained by copolymerizing these monomers in the presence of a suitable solvent and a suitable polymerization initiator.

Examples of the epoxy polyols include epoxy polyols obtained by reaction of the above-mentioned low-molecular-weight polyol with a polyfunctional halohydrin such as epichlorohydrin and β-methyl epichlorohydrin.

Examples of the natural oil polyols include hydroxyl group-containing natural oil such as castor oil and coconut oil.

Examples of the silicone polyols include copolymers in which vinyl group-containing silicone compounds such as γ-methacryloxypropyl trimethoxy silane are used as another copolymerizable monomer in the copolymerization of the above acrylic polyols; and terminal alcohol-modified polydimethylsiloxane.

Examples of the fluorine polyols include copolymers in which vinyl group-containing fluorine compounds such as tetrafluoroethylene and chlorotrifluoroethylene are used as another copolymerizable monomer in the copolymerization of the above acrylic polyols.

Examples of the polyolefin polyols include polybutadiene polyol and partially saponified ethylene-vinylacetate copolymer. These macropolyols have a number average molecular weight of 200 to 8,000, or preferably 300 to 5,000, and have a hydroxyl equivalent of 80 to 5,000, or preferably 100 to 3,000.

These macropolyols may be used alone or in combination of two or more kinds. Among these macropolyols, polyether polyol and/or polycarbonate polyol are preferable.

One kind or two or more kinds of polyol compounds are appropriately selected from the low-molecular-weight polyols and the macropolyols, both described above. The low-molecular-weight polyol and the macropolyol can also be used independently or in combination. Preferably, the low-molecular-weight polyol and the macropolyol are used in combination. When the low-molecular-weight polyol and the macropolyol are used in combination, the ratio of the low-molecular-weight polyol to the macropolyol is set so that the low-molecular-weight polyol is in the range of, for example, 0.5 to 200 parts by weight, or preferably 1 to 100 parts by weight, per 100 parts by weight of the macropolyol.

In the present invention, the active hydrogen group-containing compound having anionic group is a compound having one or more anionic groups such as a carboxyl group, a sulfonyl group, a phosphoric acid group, a betaine-structure-containing group such as sulfobetaine, and having two or more active hydrogen groups such as a hydroxyl group and an amino group, capable of reacting with an isocyanate group. Examples thereof include compounds having one anionic group and having two or more active hydrogen groups.

More specifically, examples of the active hydrogen group-containing compound having carboxyl group include dihydroxy carbonic acid such as 2,2-dimethylolacetic acid, 2,2-dimethylollactic acid, 2,2-dimethylolpropionic acid, 2,2-dimethylolbutanoic acid, 2,2-dimethylolbutyric acid, 2,2-dimethylolvaleric acid; and diamino carbonic acid such as lysine and arginine.

Examples of the active hydrogen group-containing compound having sulfonyl group include N,N-bis(2-hydroxyethyl)-2-aminoethanesulfonic acid, 1,3-phenylenediamine-4,6-disulfonic acid, diaminobutanesulfonic acid, 3,6-diamino-2-toluenesulfonic acid and 2,4-diamino-5-toluenesulfonic acid.

Examples of the active hydrogen group-containing compound having phosphoric acid group include 2,3-dihydroxypropylphenylphosphate.

Examples of the active hydrogen group-containing compound having betaine-structure-containing group include sulfobetaine group-containing compounds obtained by reaction of tertiary amines such as N-methyldiethanolamine and 1,3-propanesultone.

Further, modified alkylene oxides produced by adding alkylene oxides, such as ethylene oxide and propylene oxide, to the active hydrogen group-containing compounds having those anionic groups can also be included.

These active hydrogen group-containing compounds having the anionic groups may be used alone or in combination of two or more kinds. Among them, the active hydrogen group-containing compound having the carboxyl group is preferable.

The active hydrogen group-containing compound having the anionic group is mixed at a ratio of 1 to 100 parts by weight, or preferably 2 to 50 parts by weight, per 100 parts by weight of the polyol compound.

The active hydrogen group-containing compound having the anionic group is mixed at a ratio of 10 to 100 milliequivalents of anionic group, or preferably 15 to 60 milliequivalents of anionic group, per 100 g of urethane prepolymer to be described later, though not limited thereto.

When the anionic group is contained 15 milliequivalents or more per 100 g of the urethane prepolymer, the urethane prepolymer can achieve improved stability when aqueously dispersed. When the anionic group is contained 60 milliequivalents or less per 100 g of the urethane prepolymer, more economical production can be achieved, and the hydrophilicity of the aqueous polyurethane resin can be suitably maintained.

In the present invention, the active hydrogen group-containing acrylate compound is a (meth)acrylate compound having one or more hydroxyl groups, or preferably having one hydroxyl group (an acrylate compound and/or a methacrylate compound, hereinafter referred to as (meth)acrylate; and a (meth)acryloyl group refers to an acryloyl group and/or a methacryloyl group) and examples thereof include 2-hydroxyethyl(meth)acrylate, hydroxypropyl(meth)acrylate, hydroxybutyl(meth)acrylate, 2,2-dihydroxymethylbutyl (meth)acrylate, polyhydroxyalkyl maleate and polyhydroxyalkyl fumarate. These active hydrogen group-containing acrylate compounds may be used alone or in combination of two or more kinds. Among them, 2-hydroxyethyl(meth)acrylate is preferable.

The active hydrogen group-containing acrylate compound is mixed at a ratio of 0.4 to 25 parts by weight, or preferably 0.8 to 15 parts by weight, per 100 parts by weight of the polyol compound.

In the present invention, the alkoxysilyl group-containing polyamine compound is a compound having one or more alkoxysilyl groups, or preferably 1 to 3 alkoxysilyl groups, and having two or more amino groups, or preferably two amino groups. In the alkoxysilyl group, examples of the alkoxy group to be bonded with Si atom include alkoxy groups of 1 to 4 carbon atoms, such as a methoxy group, an ethoxy group, a propoxy group, a butoxy group, an isopropoxy group and an isobutoxy group, and a methoxy group and an ethoxy group are preferable.

The alkoxysilyl group-containing polyamine compound has an amine value of preferably 300 to 700 KOHmg/g, or more preferably 400 to 550 KOHmg/g.

Examples of the alkoxysilyl group-containing polyamine compound include alkoxysilyl compounds having a primary amino group and a secondary amino group, and is represented by the following general formula (1).

General Formula (1):

[Chem. 5]

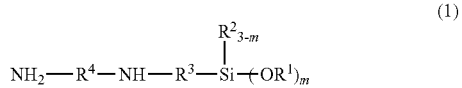

(wherein R1 and R2 are the same or different from each other, and each represents an alkyl group of 1 to 4 carbon atoms; R3 and R4 are the same or different from each other, and each represents an alkylene group of 1 to 4 carbon atoms; and m represents an integer of 1 to 3.)

In the above-mentioned general formula (1), examples of each of R1 and R2 include an alkyl group of 1 to 4 carbon atoms, such as a methyl group, an ethyl group, a propyl group and a butyl group. Further, examples of each of R3 and R4 include an alkylene group of 1 to 4 carbon atoms, such as a methylene group, an ethylene group, a propylene group and a butylene group.

More specifically, examples of the alkoxysilyl group-containing polyamine compound include N-β(aminoethyl)-γ-aminopropylmethyl dimethoxysilane, N-β(aminoethyl)-γ-aminopropyl trimethoxysilane, γ-(2-aminoethyl) aminopropyl triethoxysilane, γ-(2-aminoethyl)aminopropyl dimethoxysilane, γ-(2-aminoethyl)aminopropyl diethoxysilane, γ-aminopropyl trimethoxysilane, γ-aminopropyl triethoxysilane, γ-aminopropyl dimethoxysilane, γ-aminopropyl diethoxysilane and N,N'-bis[(a-(trimethoxysilyl)propyl)] ethylenediamine.

These alkoxysilyl group-containing polyamine compounds may be used alone or in combination of two or more kinds. Among them, N-β(aminoethyl)-γ-aminopropylmethyl dimethoxysilane and N-β(aminoethyl)-γ-aminopropyl trimethoxysilane are preferable.

The alkoxysilyl group-containing polyamine compound is mixed at a ratio of 0.5 to 30 parts by weight, or preferably 1 to 10 parts by weight, per 100 parts by weight of the polyol compound.

In the present invention, the polyisocyanate compound is a compound having two or more isocyanate groups, and examples thereof include aliphatic polyisocyanate, cycloaliphatic polyisocyanate, aralkyl polyisocyanate and aromatic polyisocyanate.

Examples of the aliphatic polyisocyanate include aliphatic diisocyanates such as hexamethylene diisocyanate (HDI), trimethylene diisocyanate, tetramethylene diisocyanate, pentamethylene diisocyanate, 1,2-, 2,3- or 1,3-butylene diisocyanate and 2,4,4- or 2,2,4-trimethyl hexamethylene diisocyanate.

Examples of the cycloaliphatic polyisocyanate include cycloaliphatic diisocyanates such as 3-isocyanatomethyl-3,5,5-trimethylcyclohexyl isocyanate (isophorone diisocyanate, IPDI), 4,4'-, 2,4'- or 2,2'-dicyclohexylmethane diisocyanate or mixtures thereof ($H_{12}$MDI), 1,3- or 1,4-bis(isocyanatomethyl)cyclohexane or mixtures thereof ($H_6$XDI), bis(isocyanatomethyl)norbornane (NBDI), 1,3-cyclopentene diisocyanate, 1,4-cyclohexane diisocyanate, 1,3-cyclohexane diisocyanate, methyl-2,4-cyclohexane diisocyanate and methyl-2,6-cyclohexane diisocyanate.

Examples of the aralkyl polyisocyanate include aralkyl diisocyanates such as 1,3- or 1,4-xylylene diisocyanate or mixtures thereof (XDI), 1,3- or 1,4-tetramethyl xylylene diisocyanate or mixtures thereof (TMXDI) and ω,ω'-diisocyanate-1,4-diethylbenzene.

Examples of the aromatic polyisocyanate include aromatic diisocyanates such as 4,4'-, 2,4'- or 2,2'-diphenylmethane diisocyanate or mixtures thereof (MDI), 2,4- or 2,6-tolylene diisocyanate or mixtures thereof (TDI), 4,4'-toluidine diisocyanate (TODI), 1,5-naphthalene diisocyanate (NDI), m-, or p-phenylene diisocyanate or mixtures thereof, 4,4'-diphenyl diisocyanate and 4,4'-diphenyletherdiisocyanate.

Examples of the polyisocyanate compound include multimers (e.g., dimers, trimers, etc.) of the above-mentioned various polyisocyanate compounds; and biuret-, allophanate-, oxadiazinetrione- and polyol-modified polyisocyanates produced by reaction of the above-mentioned various polyisocyanate compounds or multimers thereof with water, alcohol or the above-mentioned low-molecular-weight polyol, carbon dioxide, and the above-mentioned low-molecular-weight polyol, respectively.

These polyisocyanate compounds may be used alone or in combination of two or more kinds. Among them, aliphatic polyisocyanate and/or cycloaliphatic polyisocyanate is/are preferable, and more specifically, at least one diisocyanate compound selected from the group consisting of hexamethylene diisocyanate, 3-isocyanatomethyl-3,5,5-trimethylcyclohexyl isocyanate, 4,4'-, 2,4'- or 2,2'-dicyclohexylmethane diisocyanate or mixtures thereof, 1,3- or 1,4-bis(isocyanatomethyl)cyclohexane or mixtures thereof, and bis(isocyanatomethyl)norbornane may be used.

Further, the polyisocyanate compound preferably includes a polymer comprising a polyisocyanate compound having a uretdione bond (uretdione group-containing polyisocyanate compound), which is represented by the following general formula (2).

General Formula (2):

[Chem. 6]

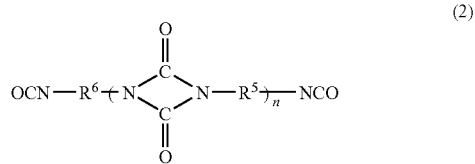

(2)

(wherein R5 and R6 are the same or different from each other, and each represents a divalent hydrocarbon group of 6 to 13 carbon atoms; and n represents an integer of 1 to 10.)

In the above general formula (2), each of R5 and R6 is an aliphatic, cycloaliphatic, aralkyl or aromatic divalent hydrocarbon group of 6 to 13 carbon atoms, such as residue of the above-mentioned polyisocyanate compound (i.e., residue remaining after removal of an isocyanate group from the above-mentioned polyisocyanate compound (divalent hydrocarbon residues)), and examples of the residue thereof include HDI residue, IPDI residue, $H_{12}$MDI residue, $H_6$XDI residue, NBDI residue, XDI residue, TMXDI residue, MDI residue, TDI residue, TODI residue and NDI residue.

More specifically, examples of the uretdione group-containing polyisocyanate compound include those based on HDI, IPDI, $H_{12}$MDI, $H_6$XDI, NBDI, XDI, TMXDI, MDI, TDI, TODI and NDI. Among them, HDI-based uretdione group-containing polyisocyanate compound, IPDI-based uretdione group-containing polyisocyanate compound, $H_{12}$MDI-based uretdione group-containing polyisocyanate compound, $H_6$XDI-based uretdione group-containing polyisocyanate compound and NBDI-based uretdione group-containing polyisocyanate compound are preferable.

The uretdione group-containing polyisocyanate compound is contained at a ratio of 1 to 90 parts by weight, or preferably 5 to 80 parts by weight, per 100 parts by weight of the polyisocyanate compound.

When the uretdione group-containing polyisocyanate compound is mixed, the isocyanate group can be regenerated by heating the resulting aqueous polyurethane resin to 80 to 160° C. to cleave the uretdione bond. Therefore, the aqueous polyurethane resin can be thermally cured.

The polyurethane resin of the present invention is synthesized by reacting an active hydrogen group-containing component (i.e., at least a polyol compound, an active hydrogen group-containing compound having anionic group, an active hydrogen group-containing acrylate compound and an alkoxysilyl group-containing polyamine compound) and a polyisocyanate component (i.e., polyisocyanate compound) by a method such as one shot method and prepolymer method. The method is not particularly limited thereto and the prepolymer method is preferably used for the synthesis.

In the prepolymer method, first, the polyol compound and the active hydrogen group-containing compound having anionic group, and the polyisocyanate compound are mixed at an equivalent ratio exceeding 1, or preferably 1.1 to 2.5 of the isocyanate group to the active hydrogen group (hydroxyl group and amino group) (NCO/active hydrogen group), and allowed to react until the isocyanate group content corresponds NCO % of 1 to 12%, or preferably 2 to 10%. Thereafter, the active hydrogen group-containing acrylate compound is mixed therewith at an equivalent ratio of 2 to 25, or preferably 3 to 15 of the remaining isocyanate group to the active hydrogen group (remaining NCO/active hydrogen group) and the resulting mixture is further allowed to react.

Thus, the reaction of the polyol compound and the active hydrogen group-containing compound having anionic group with the polyisocyanate compound leads to the synthesis of an urethane prepolymer having an isocyanate group at its molecular terminal, first and then the active hydrogen group-containing acrylate compound is mixed with the urethane prepolymer and is allowed to react 4 to 50% by mol, or preferably 5 to 30% by mol, of the isocyanate group of the urethane prepolymer with the active hydrogen group-containing acrylate compound, which leads to the synthesis of an urethane prepolymer having an isocyanate group and a (meth)acryloyl group at its molecular terminal.

Such urethane prepolymer is a self-emulsification-type urethane prepolymer having 50 to 96% by mol, or preferably 70 to 95% by mol of isocyanate groups, and 4 to 50% by mol, or preferably 5 to 30% by mol of (meth)acryloyl groups, per 100% by mol of the molecular terminals thereof, and The isocyanate group content thereof is an NCO % of, for example, 2 to 10%, or preferably 1 to 8%.

The urethane prepolymer has an average functionality of, for example, 1.1 to 3.5, or preferably 1.5 to 2.5 and a number average molecular weight of, for example, 700 to 10,000, or preferably 1,000 to 6,000.

The synthesis of the urethane prepolymer is performed under normal pressure, or if necessary, under a nitrogen atmosphere, while the reaction temperature is set in the range of, for example, 40 to 120° C., or preferably 50 to 100° C., and the reaction duration is set in the range of, for example, for 2 to 20 hours, or preferably for 4 to 15 hours.

Further, in the synthesis of the urethane prepolymer, if necessary, a reaction solvent can be used or a reaction catalyst can be added.

The reaction solvent is inert to an isocyanate group, and is rich in hydrophilicity, and examples thereof include alcohols such as ethanol and isopropanol; ketones such as acetone and methyl ethyl ketone; esters such as ethyl acetate, butyl acetate and isopropyl acetate; ethers such as tetrahydrofuran; cellosolves such as methyl cellosolve and ethyl cellosolve; carbitols such as methyl carbitol and ethyl carbitol; nitriles such as acetonitrile; and amides such as N,N-dimethylformamide and N-methyl pyrrolidone. The amount of the reaction solvent used is appropriately determined.

Examples of the reaction catalyst include known urethanizing catalysts such as amine catalyst, tin catalyst and lead catalyst. The addition amount of the reaction catalyst is appropriately determined.

Further, after the synthesis of the urethane prepolymer, the free (unreacted) polyisocyanate compound can also be removed from the resulting urethane prepolymer by a known removal means such as distillation or extraction.

Thereafter, in this method, after the anionic group is neutralized, the urethane prepolymer is dispersed in water.

For neutralization of the anionic group, a neutralizing agent selected from amines such as trimethylamine, triethylamine, tri-n-propylamine, tributylamine and triethanolamine; inorganic alkali salts such as potassium hydroxide and sodium hydroxide; and others such as ammonia is added to the urethane prepolymer to form a salt of anionic group.

The addition amount of the neutralizing agent is in the range of, for example, 0.4 to 1.2 equivalents, or preferably 0.6 to 1.0 equivalents, per one equal amount of the anionic group.

The urethane prepolymer is dispersed in water for example, by gradually adding water to the urethane prepolymer with stirring, or by gradually adding the urethane prepolymer to water with stirring. Thus, an aqueous dispersion of the urethane prepolymer is prepared. In the stirring, preferably, a mixer such as a homomixer is used to provide high shear in the mixture.

The addition amount of water is appropriately determined according to the desired weight of the solid content in the aqueous dispersion of the aqueous polyurethane resin, and is in the range of, for example, 20 to 1,000 parts by weight per 100 parts by weight of the urethane prepolymer.

The anionic group can be neutralized at any stage of before the synthesis of the urethane prepolymer, after the synthesis of the urethane prepolymer, and after chain extension reaction to be described later. However, when the neutralization is performed after the synthesis of the urethane prepolymer (before aqueously dispersed), the urethane prepolymer can achieve improved stability in water.

Then, after the urethane prepolymer is aqueously dispersed, the urethane prepolymer and the alkoxysilyl group-containing polyamine compound are allowed to react.

This reaction refers to a chain extension reaction such that the urethane prepolymer reacts with the alkoxysilyl group-containing polyamine compound to be chain-extended, and the alkoxysilyl group-containing polyamine compound is used as a chain extender for use in chain-extending the urethane prepolymer.

In the chain extension reaction, if necessary, other amines and hydrazines (other amines and hydrazines are included in the active hydrogen group-containing component), excluding the alkoxysilyl group-containing polyamine compound, can also be used in combination as a chain extender. Examples of such other amines and hydrazines include monoamines such as ethylamine, butylamine, isopropylamine and dibutylamine; diamines such as ethylenediamine, 1,3-propanediamine, 1,4-butanediamine, 1,6-hexamethylenediamine, 1,4-cyclohexanediamine, 3-isocyanatomethyl-3,5,5-trimethylcyclohexyl isocyanate (isophorone diamine), 4,4'-dicyclohexylmethanediamine, 2,5(2,6)-bis(aminomethyl) bicyclo[2.2.1]heptane and 1,3-bis(aminomethyl) cyclohexane; polyamines such as diethylenetriamine, triethylenetetramine and tetraethylenepentamine; amino alcohols such as N-(2-aminoethyl)ethanolamine; hydrazine such as hydrazine and adipic acid dihydrazide, and derivatives thereof. These other amines and hydrazines also include those having masked amino groups, as ketimine, ketazine or amine salt.

These other amines and hydrazines for combination use may be used alone or in combination of two or more kinds. Among them, diamines, amino alcohols and hydrazines are preferable. Further, the other amines and hydrazines for combination use are used in combination in the range of, for example, 1,000 parts by weight or less, or preferably 5 to 700 parts by weight, per 100 parts by weight of the alkoxysilyl group-containing polyamine compound.

For the chain extension reaction, a chain extender (an alkoxysilyl group-containing polyamine compound, and if necessary, other amines and hydrazines) is mixed with the aqueous dispersion of the urethane prepolymer. The chain extender is mixed at an equivalent ratio exceeding 1, or preferably from 1.1 to 20 of the isocyanate group of the urethane prepolymer to the amino group of the chain extender (NCO group/amino group).

In this chain extension reaction, more specifically, the chain extender is rapidly dropped into the aqueous dispersion of the urethane prepolymer with stirring (i.e., within a short time within which the reaction of the isocyanate group with water does not proceed yet). Preferably, the stirring is performed with a mixer such as a homomixer so as to provide high shear in the mixture. The chain extender to be dropped can be prepared as an aqueous amine solution by preliminarily diluting the chain extender with water.

The chain extension reaction is performed under normal pressure, or if necessary, under a nitrogen atmosphere, while the reaction temperature is set in the range of, for example, 5 to 30° C., or preferably 5 to 25° C., in order to suppress the reaction of the isocyanate group of the urethane prepolymer and water, and the reaction duration is set in the range of, for example, for 0.5 to 10 hours, or preferably for 1 to 5 hours.

After completion of the dropping of the chain extender, the stirring continues further to complete the reaction at room temperature, for example. Thus, the aqueous polyurethane resin of the present invention can be prepared as an aqueous dispersion. The aqueous dispersion of the aqueous polyurethane resin has usually a pH in the range of approximately 7 to 9.

The aqueous dispersion of the aqueous polyurethane resin thus obtained is prepared so as to have a solid content of, for example, 5 to 60% by weight, or preferably 10 to 50% by weight.

In the case of using a reaction solvent in the synthesis of the urethane prepolymer, the reaction solvent is distilled off after completion of the reaction of the urethane prepolymer, or after completion of the chain extension reaction, for example, by heating at an appropriate temperature under a reduced pressure.

In the aqueous polyurethane resin of the present invention, or its aqueous dispersion, there can be appropriately mixed additives such as plasticizer, antifoamer, leveling agent, antifungal agent, anticorrosives, delustrant, fire retardant, thixotropic agent, adhesion providing agent, thickener, lubricant, antistatic agent, surfactant, reaction retardant, antioxidant, ultraviolet absorber, anti-hydrolysis agent, weathering stabilizer, colorant, inorganic pigment, organic pigment, extender pigment, curing agent, anti-tack agent and the like, as long as an advantageous effect of the present invention is not prevented. The mixing ratio of such various additives is appropriately selected according to the purposes and applications.

In various industrial fields, the aqueous polyurethane resin of the present invention thus obtained exhibits excellent adhesion and adhesiveness between different kinds of members, and therefore can be used as a primer or an adhesive, for example. The aqueous polyurethane resin of the present invention can be used as a primer for plastics or an adhesive for plastics, for example, because of its excellent adhesion and adhesiveness to plastics.

Further, the aqueous polyurethane resin of the present invention can provide good adhesion between a plastic substrate and a coat layer laminated on the plastic substrate. Therefore, the aqueous polyurethane resin of the present invention can be suitably used as a primer for plastics.

In particular, the aqueous polyurethane resin of the present invention can provide good adhesion between a plastic lens substrate and a coat layer such as a hard-coat layer and a photochromic coat layer, laminated thereon. Therefore, the aqueous polyurethane resin of the present invention can be suitably used as a primer for optical plastic lenses.

In the case of using the aqueous polyurethane resin of the present invention as a primer for optical plastic lenses, examples of the plastic lens substrate include those of thermoplastic resins such as (meth)acrylic resin and polycarbonate resin; and those of crosslinking resins such as polyfunctional (meth)acrylic resin, allyl resin, thiourethane resin, urethane resin and thioepoxy resin, though not limited thereto.

Examples of the coating agent for use in forming the coat layer include urethane coating agent, acrylic coating agent and acrylamide coating agent.

In the case of using the aqueous polyurethane resin of the present invention as a primer for optical plastic lenses, for example, first, the aqueous dispersion of the aqueous polyurethane resin of the present invention is coated over a surface of the plastic lens substrate by a known coating method such as dipping, spin coating and dip spin coating with a coating amount of, for example, 0.1 to 200 g/m$^2$, or preferably 0.2 to 150 g/m$^2$, and then, the coating is dried at a temperature of, for example, 20 to 180° C., or preferably 40 to 160° C. to form a film. Next, a coating agent is applied onto the film-formed surface of the aqueous polyurethane resin with a coating amount of, for example, 10 to 500 g/m$^2$, or preferably 20 to 250 g/m$^2$, and the coating is then cured.

Thus, the use of the aqueous polyurethane resin of the present invention as a primer for optical plastic lenses can form a coat layer such as a hard-coat layer and a photochromic coat layer on a surface of a plastic lens substrate with good adhesion.

Moreover, the aqueous polyurethane resin of the present invention exhibits good wettability with the coat layer such as a hard-coat layer and a photochromic coat layer, thereby not repellent to the coat layer. As a result, excellent adhesion between the plastic lens substrate and the coat layer can be ensured.

EXAMPLES

While in the following, the present invention is described with reference to Examples and Comparative Examples, the present invention is not limited to any of them.

Example 1

Synthesis of Primer A

A four-neck flask equipped with a stirrer, a thermometer, a reflux condenser and a nitrogen inlet tube was charged with 205.6 g of UH-CARB200 (polycarbonatediol having an average molecular weight of 2,000, manufactured by Ube Industries, Ltd.), 15.4 g of triethylene glycol, 11.2 g of dimethylolpropionic acid, 1.8 g of trimethylolpropane and 145.0 g of acetonitrile.

Thereafter, 91.1 g of 1,3-(bisisocyanato methyl)cyclohexane was added into the four-neck flask and the mixture was allowed to react at 75° C. for 6 hours. After the isocyanate content (NCO %) of the reaction solution came to be 2.9% by mol, 4.8 g of 2-hydroxyethyl acrylate and 0.017 g of stannous octoate were added into the four-neck flask, and the mixture was allowed to react at 70° C. for 2 hours to thereby obtain an urethane prepolymer (NCO %=2.45%).

The reaction solution was cooled to 40° C. and thereafter neutralized with 8.3 g of triethylamine. Then, 650 g of ion exchange water was gradually added thereto and aqueously dispersed. Next, an amine aqueous solution having 4.9 g of hydrazine monohydrate and 6.8 g of KBM602 (N-β(aminoethyl)-γ-aminopropylmethyl dimethoxy silane, manufactured by Shin-Etsu Chemical Co., Ltd.) dissolved in 46.8 g of ion exchange water was added to an aqueous dispersion of the urethane prepolymer and then subjected to chain extension reaction. Further, acetonitrile was distilled away to thereby obtain a primer A as an aqueous dispersion of aqueous polyurethane resin having a solid content of 35% by weight.

The coating film properties of the primer A were measured and the followings were found: 100% modulus of 6.5 MPa; breaking strength of 45 MPa; elongation at break of 370%; and glass transition temperature of 62° C.

Example 2

Synthesis of Primer B

A four-neck flask equipped with a stirrer, a thermometer, a reflux condenser and a nitrogen inlet tube was charged with 201.5 g of PTG2000SN (polytetramethylene ether glycol having an average molecular weight of 2,000, manufactured by Hodogaya Chemical Co., Ltd.), 15.1 g of triethylene glycol, 11.0 g of dimethylolpropionic acid, 1.8 g of trimethylolpropane and 145.1 g of acetonitrile.

Thereafter, 81.2 g of 1,3-(bisisocyanato methyl) cyclohexane and 15.0 g of D-195N (uretdione group-containing hexamethylene diisocyanate, manufactured by Mitsui Chemicals Polyurethanes, Inc.) were added into the four-neck flask, and the mixture was allowed to react at 75° C. for 6 hours. After the isocyanate content (NCO %) of the reaction solution came to be 2.9% by mol, 4.7 g of 2-hydroxyethyl acrylate and 0.017 g of stannous octoate were added into the four-neck flask, and the mixture was allowed to react at 70° C. for 2 hours to thereby obtain an urethane prepolymer (NCO %=2.40%).

The reaction solution was cooled to 40° C. and thereafter neutralized with 8.1 g of triethylamine. Then, 650 g of ion exchange water was gradually added thereto and aqueously dispersed.

Next, an amine aqueous solution having 4.9 g of hydrazine monohydrate and 6.7 g of KBM602 (N-β(aminoethyl)-γ-aminopropylmethyl dimethoxy silane, manufactured by Shin-Etsu Chemical Co., Ltd.) dissolved in 46.4 g of ion exchange water was added to an aqueous dispersion of the urethane prepolymer and then subjected to chain extension reaction.

Further, acetonitrile was distilled away to thereby obtain a primer B as an aqueous dispersion of aqueous polyurethane resin having a solid content of 35% by weight.

The coating film properties of the primer B were measured and the followings were found: 100% modulus of 3.1 MPa; breaking strength of 26 MPa; elongation at break of 450%; and glass transition temperature of 36° C.

Comparative Example 1

Synthesis of Primer C

A four-neck flask equipped with a stirrer, a thermometer, a reflux condenser and a nitrogen inlet tube was charged with 213.5 g of PTG2000SN (polytetramethylene ether glycol having an average molecular weight of 2,000, manufactured by Hodogaya Chemical Co., Ltd.), 16.0 g of triethylene glycol, 11.7 g of dimethylolpropionic acid and 144.5 g of acetonitrile.

Thereafter, 87.5 g of 1,3-(bisisocyanato methyl)cyclohexane was added into the four-neck flask, and the mixture was allowed to react at 75° C. for 6 hours. Subsequently, 0.017 g of stannous octoate was added thereto, and the mixture was allowed to react at 70° C. for 2 hours to thereby obtain an urethane prepolymer (NCO %=2.67%).

The reaction solution was cooled to 40° C. and thereafter neutralized with 8.6 g of triethylamine. Then, 650 g of ion exchange water was gradually added thereto and aqueously dispersed.

Next, an amine aqueous solution having 5.4 g of hydrazine monohydrate and 7.4 g of KBM602 (N-β(aminoethyl)-γ-aminopropylmethyl dimethoxy silane, manufactured by Shin-Etsu Chemical Co., Ltd.) dissolved in 51.2 g of ion exchange water was added to an aqueous dispersion of the urethane prepolymer and then subjected to chain extension reaction. Further, acetonitrile was distilled away to thereby obtain a primer C as an aqueous dispersion of aqueous polyurethane resin having a solid content of 35% by weight.

The coating film properties of the primer C were measured and the followings were found: 100% modulus of 3.1 MPa; breaking strength of 36 MPa; elongation at break of 550%; and glass transition temperature of 20° C.

Comparative Example 2

Synthesis of Primer D

A four-neck flask equipped with a stirrer, a thermometer, a reflux condenser and a nitrogen inlet tube was charged with 152.9 g of PTG2000SN (polytetramethylene ether glycol having an average molecular weight of 2,000, manufactured by Hodogaya Chemical Co., Ltd.), 15.9 g of neopentyl glycol, 26.7 g of dimethylolpropionic acid and 145.6 g of acetonitrile.

Thereafter, 124.7 g of 1,3-(bisisocyanato methyl)cyclohexane was added into the four-neck flask, and the mixture was allowed to react at 75° C. for 6 hours to thereby obtain an urethane prepolymer (NCO %=3.86%).

The reaction solution was cooled to 40° C. and thereafter neutralized with 19.7 g of triethylamine. Then, 650 g of ion exchange water was gradually added thereto and aqueously dispersed.

Next, an amine aqueous solution having 10.2 g of hydrazine monohydrate dissolved in 40.8 g of ion exchange water was added to an aqueous dispersion of the urethane prepolymer and then subjected to chain extension reaction. Further, acetonitrile was distilled away to thereby obtain a primer D as an aqueous dispersion of aqueous polyurethane resin having a solid content of 35% by weight.

The coating film properties of the primer D were measured and the followings were found: 100% modulus of 19 MPa; breaking strength of 60 MPa; elongation at break of 480%; and glass transition temperature of 90° C.

Comparative Example 3

Synthesis of Primer E

Fifty parts by weight of TAKENATE M-402P (moisture-curing polyisocyanate, manufactured by Mitsui Chemicals Polyurethanes, Inc.) and 50 parts by weight of butyl acetate were mixed to thereby obtain a primer E.

Evaluation Example

1) Preparation of Hard-Coat Material A

After 47 parts by weight of dipentaerythritol hexaacrylate, 45 parts by weight of pentaerythritol triacrylate and 5 parts by weight of γ-methacryloyloxypropyl-trimethoxysilane were mixed, 3 parts by weight of DAROCUR 1173 (photopolymerization initiator, manufactured by Ciba Specialty Chemicals K.K.) was added thereto, to thereby obtain a hard-coat material A.

2) Evaluation Experiment

Each of primers A to E was applied onto a PMMA plate with an applicator so as to have a thickness after drying of 10 μm, and thereafter, the applied primer was dried at 90° C. for 10 minutes to thereby form a film.

Next, the hard-coat material A was applied onto the primer film formed on the PMMA plate with an applicator so as to have a thickness of 40 μm. Subsequently, the applied hard-coat material A was irradiated with UV rays by using a UV irradiation device comprising a high-pressure mercury-vapor lamp so as to have a dose of 500 mJ/cm$^2$ and then photocured to thereby form a hard-coat layer.

The adhesion of the resulting laminated coating film on the PMMA plate was evaluated by the cross-cut method. In addition, the wettability of the hard-coat layer to a primer layer was visually evaluated. The results are shown in Table 1.

TABLE 1

|  | Primer | Hard-Coat Layer | Cross-Cut Method (Adhesion) | Wettability |
|---|---|---|---|---|
| Evaluation Example 1 | Primer A | Hard-Coat A | 0 | A |
| Evaluation Example 2 | Primer B | Hard-Coat A | 1 | A |
| Comparative Evaluation Example 1 | Primer C | Hard-Coat A | 3 | A |
| Comparative Evaluation Example 2 | Primer D | Hard-Coat A | 5 | A |
| Comparative Evaluation Example 3 | Primer E | Hard-Coat A | 0 | B |
| Comparative Evaluation Example 4 | Absent | Hard-Coat A | 5 | A |

In Table 1, evaluation criteria for the cross-cut method (adhesion) and wettability are shown below.

Evaluation Criteria for Cross-Cut Method:

0: Every line of cuts was fine and smooth and no peeling was found on every square cut side.

1: Slight peeling of the coating film was found at the intersections of cuts. However, the affected area by the cuts was not obviously more than 5% of the whole cross-cut portion.

2: Peeling of the coating film was found along the lines of the cuts and/or at the intersections thereof. The affected area by cuts was obviously more than 5% but up to 15% of the whole cross-cut portion.

3: Significant peeling of the coating film was partially or entirely found along the lines of the cuts, and/or peeling was partially or entirely found in various portions of the square areas. The affected area by the cuts was obviously more than 15% but up to 35% of the whole cross-cut portion.

4: Significant peeling of the coating film was partially or entirely found along the lines of the cuts, and/or peeling was partially or entirely found in several square areas. The affected area by the cuts was obviously more than 35% but up to 65% of the whole cross-cut portion.

5: The peeling off was wider than that evaluated by 4.

Evaluation Criteria for Wettability:

A: No repellency was favorably observed.

B: Repellency was observed.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The aqueous polyurethane resin of the present invention can be suitably used as a primer for plastics, and particularly a primer for optical plastic lenses.

The invention claimed is:

1. An aqueous polyurethane resin obtained by allowing at least, a polyol compound comprising macropolyol, low-molecular-weight diol, and low-molecular-weight triol; an active hydrogen group-containing compound having anionic group; an active hydrogen group-containing acrylate compound; and an alkoxysilyl group-containing polyamine compound to react with a polyisocyanate compound; wherein the macropolyol is polycarbonatediol and the low-molecular weight triol is trimethylolpropane.

2. The aqueous polyurethane resin according to claim 1, which is obtained by allowing at least, the polyol compound comprising macropolyol, low-molecular-weight diol, and low-molecular-weight triol; the active hydrogen group-containing compound having the anionic group; and the active hydrogen group-containing acrylate compound to react with the polyisocyanate compound to thereby synthesize an urethane prepolymer having an isocyanate group and a (meth) acryloyl group, and allowing the urethane prepolymer to react with at least the alkoxysilyl group-containing polyamine compound.

3. The aqueous polyurethane resin according to claim 1, wherein
the alkoxysilyl group-containing polyamine compound is a compound represented by the following general formula (1), General formula (1):

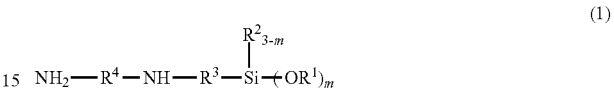

wherein $R^1$ and $R^2$ are the same or different from each other, and each represents an alkyl group of 1 to 4 carbon atoms; $R^3$ and $R^4$ are the same or different from each other, and each represents an alkylene group of 1 to 4 carbon atoms; and m represents an integer of 1 to 3.

4. The aqueous polyurethane resin according to claim 1, wherein
the polyisocyanate compound is at least one diisocyanate compound selected from the group consisting of hexamethylene diisocyanate, 3-isocyanatomethyl-3,5,5-trimethylcyclohexyl isocyanate, 4,4'-, 2,4'- or 2,2'-dicyclohexylmethane diisocyanate or mixtures thereof, 1,3- or 1,4-bis(isocyanatomethyl)cyclohexane or mixtures thereof, and bis(isocyanatomethyl)norbornane.

5. The aqueous polyurethane resin according to claim 1, wherein
the polyisocyanate compound comprises a compound represented by the following general formula (2), General formula (2):

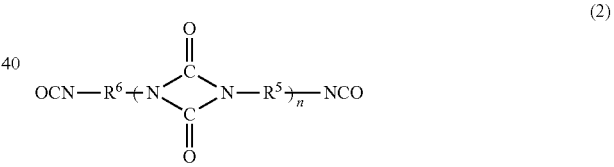

wherein $R^5$ and $R^6$ are the same or different from each other, and each represents a divalent hydrocarbon group of 6 to 13 carbon atoms; and n represents an integer of 1 to 10.

6. The aqueous polyurethane resin according to claim 5, wherein the isocyanate group is regenerated at 80 to 160° C.

7. The aqueous polyurethane resin according to claim 1, which is used as a primer for plastics.

8. The aqueous polyurethane resin according to claim 7, which is used as a primer for optical plastic lenses.

* * * * *